May 19, 1942.    R. A. MONCADA    2,283,506
MOTION TRANSFORMING MECHANISM
Filed June 21, 1941    2 Sheets-Sheet 2
Fig. 4.
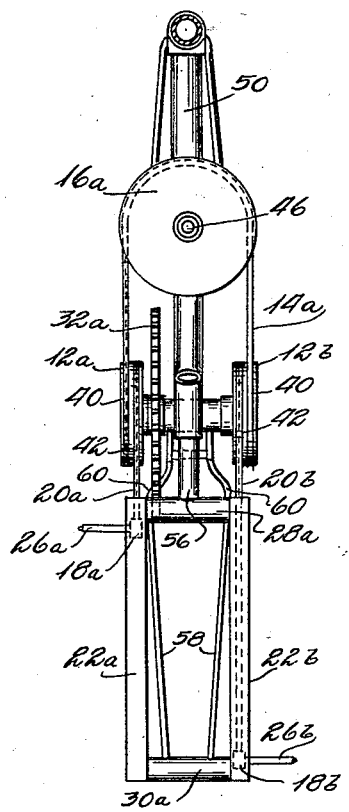
Fig. 7.
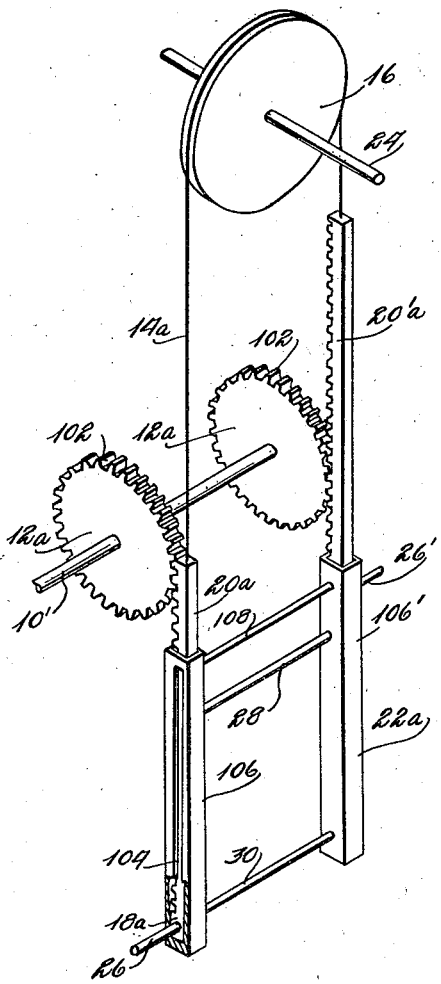
Fig. 5.
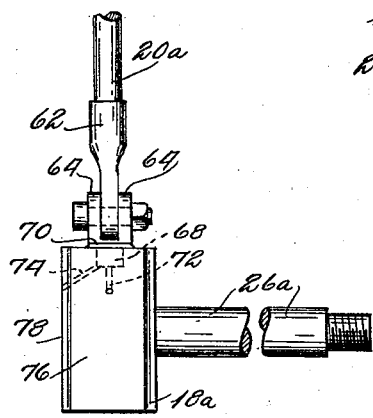
Fig. 6.
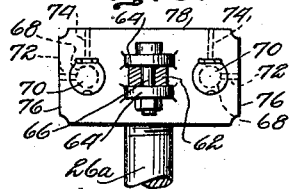
Inventor
Ramon A. Moncada,
By 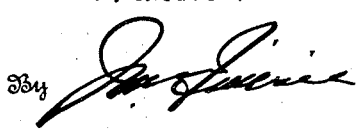
Attorney Patented May 19, 1942

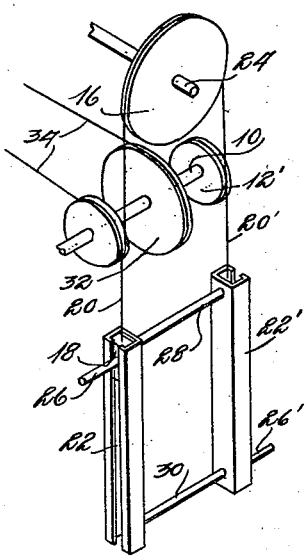

2,283,506

UNITED STATES PATENT OFFICE 2,283,506

MOTION TRANSFORMING MECHANISM

Ramon Alvarez Moncada, Cordoba, Argentina

Application June 21, 1941, Serial No. 399,187
In Argentina February 8, 1941

1 Claim. (Cl. 74—136)

The present invention relates to motion transforming mechanisms and more particularly to mechanisms adapted to convert a reciprocating into a rotary motion.

Hitherto, the mechanism most generally used for the aforesaid purpose has been based on the crank, and although this type of mechanism gives satisfactory results in a large number of cases in practice, it suffers from certain disadvantages for certain applications. These disadvantages may be more readily appreciated by considering the case of the bicycle, the motive power of which is derived from human effort.

It is known that in a crank type mechanism, the useful rotational effort varies according to a sinusoidal half-wave between two dead centers, which means, in the special case referred to, that the cyclist expends a considerable proportion of his work without notable advantage. From the sinusoidal nature of the variation of the useful effort, it follows that maximum utilization occurs at a point half way between the dead centers, and in those cases in which the impulse is applied substantially parallel to the line joining the dead centers, maximum utilization is obtained when the impulse is applied along the tangent parallel to said line, that is to say, the tangent to the circle of rotation to the crank pin, at the said point mid-way between the dead centers.

As a consequence of the foregoing, it is obvious that it would be highly advantageous to be able to apply the impulse arising from a reciprocating motion, always along said tangent, since in this way all variation in the useful effort developed by the impulse on the rotary shaft, would disappear.

The present invention, therefore, has for its principal object to provide a new mechanism adapted for general application, in which the straight-line reciprocating movement of a driving element is converted into a rotary movement by application of the driving effort along the tangent of maximum useful effort to a circle concentric with the axis of a rotary shaft forming part of the system.

Another object of this invention is to provide a motion transforming mechanism which shall be generally applicable and which shall comprise a driven rotary shaft, a pair of coupling elements guided to move with parallel straight line motion relatively to each other and adapted to be coupled to a source of driving power or effort and operative connection means connecting said elements to said shaft and including each a flexible member connected to one of said coupling elements and extending along a tangent to a circle concentric with the shaft, said tangent coinciding with the line of motion of the respective coupling element, each flexible member being anchored at its end remote from the respective coupling element to a free-wheel fast on the shaft the effective circumference of said free-wheels coinciding with that of said circle.

Another object of this invention is to provide a motion transforming mechanism which shall be generally applicable and which shall comprise a driven rotary shaft, a pair of coupling elements guided to move in parallel straight line motion relatively to each other and adapted to be coupled to a source of driving power or effort and at least a pair of operative connection means connecting said elements to said shaft and including each a free-wheel mounted on said shaft to rotate in driving connection therewith when turning in one sense, and to rotate freely with respect to said shaft when turning in the opposite sense, said free-wheel having a toothed circumference, a rack meshing with said toothed circumference and rigidly connected in straight line alinement to one of said coupling elements at one end, flexible connection means connected to the other ends of a pair of racks to connect said pair together and guiding means for changing the direction of the flexible connection means to cause its two end portions to extend in alinement with the respective rack.

A further object of this invention is to provide a bicycle incorporating the mechanism described.

These and other objects and advantages of this invention will become apparent in the course of the following description.

In the drawings:

Figure 1 is a diagrammatic perspective view showing the essential parts of the novel mechanism in their operative arrangement.

Figure 2 is an end view on an enlarged scale of the upper portion of a guide for the coupling elements.

Figure 3 is a partial side elevation of a bicycle fitted with the novel mechanism.

Figure 4 is a section along the line IV—IV of Fig. 3.

Figure 5 is a side elevation of a coupling element with a portion of the respective flexible member, and Figure 6 is a plan view partly in section of the element of Figure 5.

Figure 7 is a diagrammatic perspective view of an alternative embodiment of the present invention.

Referring first to Figure 1, in which are shown the essential parts of the new mechanism in diagrammatic form, it will be seen that the mechanism consists of a shaft 10 adapted to be driven so as to rotate in one direction, and having fast thereon a pair of free-wheels 12, 12' which are interconnected by means of a flexible connection 14 which passes over a direction changing pulley 16. Each of the free-wheels 12, 12' is likewise connected to a coupling element 18, 18' by means of flexible members 20, 20' each of which extends parallel to the respective portion of the flexible connection 14.

As shown, one end of the flexible member 20 is secured to the coupling element 18, which in turn is guided to move only along a straight line, by a guide 22. The other end of the flexible member 20 is fixed to the free-wheel 12 so that when unwinding itself therefrom it pulls said free-wheel together with the shaft, whereas when the free-wheel is driven in the opposite direction, that is to say when it is free-wheeling, said flexible member 20 is wound up on the circumference of the wheel 12 and the coupling element 18 is pulled to the end of guide 22 nearest to the shaft 10. The same arrangement holds for the coupling element 18', the flexible member 20' and the free-wheel 12', except that the point of fixing of the member 20' is displaced circumferentially with respect to that of member 20, so as to allow the coupling element 18' to be at the end of its guide 22' remote from the shaft 10 when the coupling element 18 is at the end of its respective guide 22 nearest to said shaft, and vice versa.

The flexible connection 14 serves essentially to interconnect the two free-wheels 12, 12' so that the free-wheel which receives the effective driving impulse, in the manner hereinafter described, will cause the other to rotate freely in the opposite direction. Said flexible connection is therefore wound around the circumference of each free-wheel in the sense opposite to that in which the respective flexible member is wound thereon, and moreover passes around a direction changing device, such as the pulley 16, which is free to rotate on a stub shaft 24.

The coupling elements 18, 18', may be connected in any suitable manner, to two reciprocating devices (not shown) pertaining to a source of motive power. For example, they may be directly connected to the piston rods of a pair of parallel cylinders of a steam engine or internal combustion motor, or, as in the case more particularly contemplated in this specification, they may be provided with rests or pedals 26, 26' on which a person seated above the mechanism may rest his feet. The guides 22, 22' may be connected by upper and lower cross-members 28, 30 in order to keep the guides parallel to each other.

From the foregoing it is seen that the driving effort originating from a device which reciprocates along a straight line path, is transmitted to the respective free-wheel to cause it to rotate in driving engagement with the shaft 10, and that, owing to the arrangement of the parts the said driving effort is applied to the said free-wheel always along a tangent to the circumference thereof, the orientation of which tangent with respect to the shaft 10 never varies, said tangent being in alinement with the motion of said driving device. In this way the rotational effort exerted on said shaft 10 is always maintained constant at any moment of an effective stroke of the coupling elements 18, 18'. Therefore, when one of said coupling elements, for instance, the element 18' in Figure 1, has reached the end of its useful stroke, the rotary effort transmitted by the other coupling element 18 when commencing its useful stroke will be equal to the maximum rotational effort and not, as in crank type mechanisms, a negligible fraction thereof. These facts lead to a very important advantage of the novel mechanism, namely that the intermittency in the transmission of effective effort is eliminated. This intermittency is due to the sinusoidal form of the curve of utilization of the driving effort in crank type mechanisms, since at each end of the half wave, the useful effort transmitted is insignificant, so that until the effective crank has moved some distance beyond dead center of start, it does not exert any effective tractive effort on the driven shaft, which with its associated parts must run by inertia for an appreciable proportion of its revolutions.

The shaft 10 may be the true main shaft of a driven machine, or may have secured to it a transmission wheel or pulley, such as the pulley 32, which may be coupled by means of a chain or belt 34 to a driven element (not shown in Figure 1). Those skilled in the art will readily understand that the mechanism described is susceptible of a large number of applications, but for the better understanding of the present invention, a particular embodiment of the invention as applied to a bicycle will now be described with reference to Figures 2 to 6, since in such an embodiment the advantages derived form the present invention are of particular importance, as they directly alleviate the task of the cyclist.

As seen from Figures 3 and 4, the driven shaft is the shaft 10a of the chain wheels 32a, which is coupled by means of chain 34 to the chain pinion of the free-wheel 36 operatively associated with the rear wheel 38 of the bicycle. In addition to chain wheel 32a, shaft 10a carries the right and left hand free wheels 12a and 12b, which may be in the form of chain pinions or, as shown for the sake of simplicity, in that of pulleys, but in any event, each free wheel 12a, 12b has two circumferential element receiving surfaces, indicated by the reference numbers 40 and 42 in Figure 4, in which receiving surface 40 is shown to the outside with respect to the bicycle, and is adapted to have secured to it the flexible member 20a or 20b, respectively, the other end of the member being connected to the respective crosshead 18a, 18b, adapted to slide in a channel shape guide 22a or 22b, suspended from the rising inclined tube 44 of the bicycle frame. The other or inner receiving surface 42 of each free-wheel 12a and 12b has fixed thereto one end of the flexible connection element 14a, which passes over a direction changing pulley or wheel 16a mounted to rotate on the end of a stub shafe 46 (Fig. 4), which projects from a supporting tube 48, extending from the rear descending tube 50 of the bicycle frame and reinforced by an auxiliary riser tube 52 projecting from the riser member 44.

From Figures 2 and 4 it will be seen that according to the embodiment shown, the guides 22a and 22b have a substantially U shape cross-section with inturned flanges 54 along their longitudinal free edges, and are interconnected by means of an upper cross tube 28a and a lower cross tube 30a, said cross tubes being fixedy connected to the bicycle frame by means of a descending tube 56 projecting from the riser member 44 and two rear riser bars 58 the ends of which are secured to the arms 60 of the rear fork, whereby the stability of the guide assembly is ensured.

The flexible members 20a and 20b which operatively connect the cross-heads 18a, 18b to the free-wheels 12a, 12b, may be chains, but in the drawings they have been shown as cables having secured to each end an eyelet 62 (Figures 2 and 7). The eyelet 62 attached to the cross head is inserted between two lugs 64 projecting from the cross-head, and is secured thereto by means of a bolt 66. The cross-head which may be solid is provided with oiling holes 68 having covers 70, said oiling holes communicating by way of ducts 72, 74 formed in the cross-head, with the side faces 76 and rear face 78 thereof and hence with the interior of the guide 18a or 18b. The ends of the upper cross tube 28a may be closed with a plug 80 (Fig. 2) in which a diametrical groove 82 may be formed to accommodate the flexible member, and if desired, internally threaded holes 84 may be provided to permit of the application of a detachable cover plate (not shown). It is also desirable to provide upper and lower stops in the guides positively to prevent accidental overrunning of the cross-heads 18a, 18b. Said cross-heads are provided with a stem 26a, 26b, projecting therefrom and adapted to have secured thereto as by a nut 86 a rest 88 for the respective foot of the cyclist.

The arrangement of the flexible members 20a, 20b and of the flexible connection 14a with regard to the free wheels 12a and 12b is identical with that of the equivalent elements of Figure 1 and will therefore not again be described. Owing to this arrangement, it will be appreciated that if with the parts in the positions shown in Figures 3 and 4, pressure is exerted on the stem 26a of the right hand cross-head 18a (seen to the left in Figure 4) said cross head 18a will descend thereby putting the respective flexible member 20a under tension and therefore exerting a rotational tractive effort on the free-wheel 12a, which will rotate clockwise with reference to Fig. 3, and cause shaft 10a to turn, since the arrangement is such that for this direction of rotation, the free-wheel 12a is in driving engagement with said shaft 10a. As the flexible member 12a unwinds from the outer receiving surface 40 of free wheel 12a, a portion of the flexible connection 14a is simultaneously wound up on the inner receiving surface 42 of said free wheel 12a, and consequently an equal portion of said flexible connection 14a is unwound from the inner receiving surface 42 of the other free-wheel 12b, which is therefore caused to turn freely in counterclockwise direction, thereby causing the other flexible member 20b to be wound up on the outer receiving surface 40 of said other free wheel 12b, and the other cross-head 18b to ascend in its guide 22b. When said other cross head 18b has reached the upper limit of its travel, the first cross head 18a will have reached the lower limit of its travel and the parts will be ready to commence another impulse cycle, during which, however, the cross-head 18b will deliver the effective effort and cross-head 18a will be brought back to its original position. As has already been stated, owing to the fact that the flexible members 20a and 20b extend tangentially with respect to the free wheels 12a and 12b respectively, the effective utilization of the effort applied to the cross-heads 18a and 18b is always the maximum possible with a given quantity of energy, provided that the thrust is applied parallel to the longitudinal center line of the guides 22a and 22b, that is to say in alinement with the flexible members 20a, 20b or parallel thereto.

Referring now to Figure 7, which shows diagrammatically an alternative embodiment of the present invention, in which the shaft 10a has mounted on it a pair of free-wheels 12a, 12'a each having teeth 102, 102' around the circumference, which mesh with the teeth of a pair of racks 20a, 20'a. The coupling elements of which only one is shown at 18a, have prolongations 104 rigidly connecting the coupling element to the lower end of the respective rack in straight line alinement. The other or upper ends of the racks are connected together by a flexible connection member 14a which passes over a direction changing pulley or the like 16 mounted on an auxiliary shaft 18 similarly to the arrangement of Fig. 1. The guides 22a and 22'a for the coupling members are preferably prolonged as indicated at 106, 106, to form casings for the projecting portions of the racks 20a, 20'a, and a third cross bar 108 may be provided to give added rigidity to the structure.

Obviously, if this embodiment is incorporated in a bicycle, the auxiliary stub shaft 24 cannot be located in the position shown in Fig. 3, that is to say, within the supporting tube 48, but will have to be suspended from the top bar of the frame. It is, however, preferred not to incorporate this embodiment in bicycles or the like, but to use it rather for stationary sets in which the coupling elements 18 are connected to a prime mover.

The operation of the alternative embodiment is essentially the same as already described with respect to Figs. 1 to 6, except that the flexible connection member 14a is no longer wrapped and unwrapped with respect to the free-wheels, but merely moves to and fro over the pulley 16, and that rigid reciprocating racks replace the flexible members 20. The particular advantage of the modified embodiment is that it dispenses with the double element receiving surfaces for the free-wheels and enables ordinary toothed free-wheels to be used if necessary.

The other technical advantages of the novel mechanism have already been described hereinbefore, as well as their importance with respect to such a machine as a bicycle. From the embodiment described it is seen that the novel mechanism is readily applicable in practice, and that it may be constructed in a relatively simple manner and at low cost, without requiring any very far-reaching changes in the structure or principal parts of the bicycle.

It is to be understood that the scope of the present invention is not limited to the specific embodiments described, but that sundry modifications in structure and design may be made without thereby departing from the nature and scope of the invention.

I claim:

A motion transforming mechanism comprising a shaft adapted to be driven for rotation in one sense from a source of power including driving parts reciprocating along substantially parallel straight line paths, a pair of free-wheels mounted on said shaft and adapted to rotate in driving engagement with said shaft when turning in said sense and to rotate independently of said shaft when turning in the opposite sense, a rotary direction changing device mounted above said shaft in a plane parallel to the center line of the shaft and tangent to the circumference of said free-wheels, a flexible connection having an intermediate portion partially embracing said direction changing device, a first end portion extending in said plane and anchored at its end to the circumference of one of said free-wheels, a second end portion parallel to the first end portion and anchored at its end to the circumference of the other free-wheel, a first coupling element guided to reciprocate in a path parallel to the first end portion and tangent to the circumference of the respective free-wheel, a second coupling element guided to reciprocate in 180° out of phase relationship with the first coupling element in a path parallel to the path of the first coupling element and tangent to the circumference of the other free-wheel, said coupling elements having means thereon adapted to be operatively associated with the driving parts of said source, a first flexible member having one end connected to said first coupling element and the other end connected to a point on the circumference of the respective free-wheel, a second flexible member having one end connected to said second coupling element and its other end connected to a point on the circumference of the other free-wheel, said flexible members extending parallel to the paths of their respective coupling elements, the point of anchorage of said second flexible connection being circumferentially staggered on the circumference of the second free-wheel with respect to the point of anchorage of the first flexible connection, and the point of attachment of the second flexible member being circumferentially staggered on the circumference of the second free-wheel with respect to the point of attachment of the first flexible member, the lengths of the end portions being such that when the first end portion is wrapped round the circumference of the first free-wheel, the second end portion is fully unwrapped from the second free-wheel, and the lengths of the flexible members being such that when one flexible member is fully unwrapped from one free-wheel, at least a portion of the other flexible member is wrapped round the other free-wheel, the parts being so arranged that unwrapping of the wrapped part of a flexible member in response to movement of the respective coupling element away from the respective free-wheel causes rotation of said free-wheel in driving engagement with said shaft and wrapping on the same free-wheel of the respective end portion of the flexible connection to unwrap the other end portion from the other free-wheel, whereby said other free-wheel is driven in a sense opposite to that of the rotation of the shaft, to wrap on said other free-wheel said other flexible member and maintain tension therein during movement of approach to said other free-wheel of said other coupling element.

RAMÓN ALVAREZ MONCADA.